(12) United States Patent
Agostini et al.

(10) Patent No.: US 7,347,242 B2
(45) Date of Patent: Mar. 25, 2008

(54) TIRE WITH LOW THERMAL EXPANSION COMPONENT

(75) Inventors: Giorgio Agostini, Colmar-Berg (LU); Filomeno Gennaro Corvasce, Mertzig (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 129 days.

(21) Appl. No.: 11/243,868

(22) Filed: Oct. 5, 2005

(65) Prior Publication Data

US 2007/0074801 A1    Apr. 5, 2007

(51) Int. Cl.
 *B60C 15/00*    (2006.01)
 *B60C 15/06*    (2006.01)
 *B60C 1/00*    (2006.01)
 *B60C 17/00*    (2006.01)
 *B60C 17/04*    (2006.01)

(52) U.S. Cl. .................. 152/539; 152/541; 152/547; 152/516; 152/517; 152/520

(58) Field of Classification Search ............ None
See application file for complete search history.

(56) References Cited

U.S. PATENT DOCUMENTS

| | | | | |
|---|---|---|---|---|
| 4,551,391 | A | 11/1985 | Kang et al. | 428/462 |
| 5,322,559 | A | 6/1994 | Sleight | 106/401 |
| 5,433,778 | A | 7/1995 | Sleight | 106/401 |
| 5,514,360 | A | 5/1996 | Sleight et al. | 423/593 |
| 5,919,720 | A | 7/1999 | Sleight et al. | 501/126 |
| 6,187,700 | B1 | 2/2001 | Merkel | 501/32 |
| 2002/0064655 | A1 * | 5/2002 | Morin et al. | 428/375 |
| 2003/0174994 | A1 | 9/2003 | Garito et al. | 385/129 |
| 2004/0110322 | A1 | 6/2004 | Hougham et al. | 438/119 |

FOREIGN PATENT DOCUMENTS

| | | | |
|---|---|---|---|
| DE | 3502494 | * | 8/1995 |
| GB | 1164680 | * | 9/1969 |
| JP | 57-083553 | | 5/1982 |
| JP | 58-033856 | | 2/1983 |
| JP | 2001-233028 | * | 8/2001 |

OTHER PUBLICATIONS

*Materials with Low or Negative Thermal Expansion,* as published on the Research/Technology Transfer portion of the web site for Oregon State University, www.oregonstate.edu on Mar. 11, 2005.
*Negative Thermal Expansion* by Andrew Goodwin as published on the web site for the University of Cambridge Department of Earth Sciences, www.esc.cam.ac.uk, on Mar. 11, 2005.
*Studies of the Negative Thermal Expansion in ZrW208 and ZRP207 Ceramics* as published on the web site for the University of Cambridge Department of Earth Sciences, www.esc.cam.ac.uk, on Mar. 11, 2005.
"Composites with Extremal Thermal Expansion Coefficients" as published by the *American Institute of Physics* on Nov. 18, 1996. pp. 3203 through 3205.
*Materials with Negative or Extremal Thermal Expansion,* by Rod Lakes as published on the web site for the University of Wisconsin, www.wisc.edu, on Mar. 11, 2005.
European Search Report, 2006.

* cited by examiner

*Primary Examiner*—Justin R. Fischer
(74) *Attorney, Agent, or Firm*—John D. DeLong

(57) ABSTRACT

The present invention is directed to a pneumatic tire comprising at least one component comprising a rubber composition comprising a diene based elastomer and an inorganic negative thermal expansion (NTE) filler comprising at least one compound selected from the group consisting of metal tungstates, metal phosphates, metal molybdates, metal vanadates, and metal arsenates, wherein the inorganic filler has a negative coefficient of thermal expansion in at least part of the temperature range of 0° C. to 200° C.

12 Claims, No Drawings

TIRE WITH LOW THERMAL EXPANSION COMPONENT

BACKGROUND OF THE INVENTION

Physical properties of rubber compounds measured at high temperature are typically inferior to those at ambient temperature. For example, tensile properties may show significant degradation after exposure of the rubber compound to elevated temperatures. In a practical application of the rubber compound such as in a pneumatic tire, such loss of physical properties with temperature may be undesirable. It would therefore be useful to have a rubber compound and pneumatic tire showing better retention of physical properties with increasing temperature.

SUMMARY OF THE INVENTION

The present invention is directed to a pneumatic tire comprising at least one component comprising a rubber composition comprising a diene based elastomer and an inorganic negative thermal expansion (NTE) filler comprising at least one compound selected from the group consisting of metal tungstates, metal phosphates, metal molybdates, metal vanadates, and metal arsenates, wherein the inorganic filler has a negative coefficient of thermal expansion in at least part of the temperature range of 0° C. to 200° C.

DETAILED DESCRIPTION OF THE INVENTION

There is disclosed a pneumatic tire comprising at least one component comprising a rubber composition comprising a diene based elastomer and an inorganic negative thermal expansion (NTE) filler comprising at least one compound selected from the group consisting of metal tungstates, metal phosphates, metal molybdates, metal vanadates, and metal arsenates wherein the inorganic filler has a negative coefficient of thermal expansion in at least part of the temperature range of 0° C. to 200° C.

Physical properties of filled rubber compositions are negatively affected by increases in working temperature. For example, tensile properties may be seen to decrease at higher tire working temperatures as compared with ambient temperature. This decrease in properties may in part be due to the thermal expansion of the rubber and fillers in the rubber compounds. Typical fillers such as carbon black and silica used in rubber compositions have positive coefficients of thermal expansion on the order of $10^{-5}$ to $10^{-6}$ $K^{-1}$. Elastomers used in tires have coefficients of thermal expansion on the order of $10^{-4}$ $K^{-1}$. On a relative basis, then, the thermal expansion of typical carbon black and silica fillers is not low enough to compensate for the much greater thermal expansion of the elastomers. Through the use of NTE fillers having negative coefficients of thermal expansion, it has now been found that the overall thermal expansion of the rubber compound in the tire may be reduced, resulting in a lessening of the degradation of physical properties with temperature and better retention of physical properties at high operating temperature.

The NTE filler as used in the rubber composition and tire comprises particles, or nanoparticles, with a particle size of less than 1000 nanometers (nm). In one embodiment, the NTE filler has a particle size of less than 500 nm. In another embodiment, the NTE has a particle size of less than 300 nm. In another embodiment, the NTE filler has a particle size of less than 100 nm.

In general, the NTE filler exhibits a negative coefficient of thermal expansion (NCTE). Metal tungstates, metal phosphates, metal molybdates, metal vanadates, and metal arsenates exhibiting a negative coefficient of thermal expansion are known, for example, from U.S. Pat. Nos. 5,322,559; 5,433,778; 5,514,360; and 5,919,720; all of which are fully incorporated herein by reference.

In one embodiment, the NTE filler may be $ZrW_2O_8$, $HfW_2O_8$, $Zr_2P_2WO_{12}$, or $Hf_2P_2WO_{12}$.

In another embodiment, the NTE filler may be a compound as disclosed in U.S. Pat. Nos. 5,433,778 and 5,322,559 of formula I $$A_{1-y}^{4+}A_y^{1+}A_y^{3+}V_{2-x}E_xO_7 \qquad (I)$$

wherein for formula I, x is from about 0.1 to about 1.9, y is from about 0.0 to about 0.4, and wherein $A^{4+}$ is selected from the group consisting of Hf, Zr, $Zr_a$ $M_b$, $Hf_a$ $M_b$ and mixtures thereof, wherein a plus b equals one and M is selected from the group consisting of Ti, Ce, Th, U, Mo, W, Pb, Sn, Ge and Si, $A^{1+}$ is selected from the group consisting of the alkali earth metals, $A^{3+}$ is selected from the group consisting of the rare earth metals, and E is selected from the group consisting of P and As.

In another embodiment, the NTE filler may be of compound as disclosed in U.S. Pat. No. 5,919,720 of formula II $$A_{2-x}^{3+}A_y^{4+}M_z^{3+}M_{3-y}^{6+}P_yO_{12} \qquad (II)$$

wherein for formula II $A^{3+}$ is a metal having an oxidation state of plus 3, $A^{4+}$ is a metal having an oxidation state of plus 4, $M^{3+}$ is a metal having an oxidation state of plus 3, $M^{6+}$ is a metal having an oxidation state of plus 6, y varies from about 0 to about 2, x is equal to the sum of y and z and varies from about 0.1 to about 1.9.

In one embodiment, the NTE filler has a coefficient of thermal expansion ranging from $-1 \times 10^{-7}$ to $-100 \times 10^{-7}$ $K^{-1}$ over at least part of the temperature range of 0° C. to 200° C. In another embodiment, the NTE filler has a coefficient of thermal expansion ranging from $-10 \times 10^{-7}$ to $-80 \times 10^{-7}$ $K^{-1}$ over at least part of the temperature range of 0° C. to 200° C. In another embodiment, the NTE filler has a coefficient of thermal expansion ranging from $-20 \times 10^{-7}$ to $-40 \times 10^{-7}$ $K^{-1}$ over at least part of the temperature range of 0° C. to 200° C. The coefficient of thermal expansion may be measured for example following the methods described in Attfield et al., Chem. Commun., 1998, Pages 601 and 602, or Villaescusa et al., J. Am. Chem. Soc. 2001, Vol. 123, Pages 5453 through 5459.

Suitable NTE filler may be produced by any of the methods as are known in the art, as for example taught in any of U.S. Pat. Nos. 5,322,559; 5,433,778; 5,514,360; and 5,919,720. NTE filler nanoparticles in the desired size range may be produced as taught in U.S. Publication Application No. 2003/0174994, wherein it is taught that the nanoparticles are produced using an electro-spray process. In this process, very small droplets of a solution including the nanoparticle precursor material emerge from the end of a capillary tube, the end of which is maintained at a high positive or negative potential. The large potential and small radius of curvature at the end of the capillary tube creates a strong electric field causing the emerging liquid to leave the end of the capillary as a mist of fine droplets. A carrier gas captures the fine droplets, which are then passed into an evaporation chamber. In this chamber, the liquid in the droplets evaporates and the droplets rapidly decrease in size. When the liquid is entirely evaporated, an aerosol of nanoparticles is formed. These particles may be collected to form a powder or they may be dispersed into a solution. The size of the nanoparticles is variable and depends on processing parameters. Other processes are also useful for making the nanoparticles of the present invention. For example, the nanoparticles may be fabricated by laser ablation, laser-driven reactions, flame and plasma processing, solution-phase synthesis, sol-gel processing, spray pyrolysis, flame pyrolysis, laser pyrolysis, flame hydrolysis, mechanochemical processing, sono-electro chemistry, physical vapor deposition, chemical vapor deposition, mix-alloy processing, decomposition-precipitation, liquid phase precipitation, high-energy ball milling, hydrothermal methods, glycothermal methods, vacuum deposition, polymer template processes, micro emulsion processes or any other suitable method for obtaining particles having appropriate dimensions and characteristics. The sol-gel process is based on the sequential hydrolysis and condensation of alkoxides, such as metal alkoxides, initiated by an acidic or a basic aqueous solution in the presence of a cosolvent. Controlling the extent of hydrolysis and condensation reactions with water, surfactants or coating agents can lead to final products with particle diameters in the nanometer range. The sol-gel process can be used to produce nanoscale metal, ceramic, glass and semiconductor particles. The size of nanoparticles made from varieties of methods can be determined using Transmission Electron Microscope (TEM), Atomic Force Microscope (AFM), or surface area analysis. For crystalline materials, X-ray powder diffraction pattern can also be used to calculate the crystallite size based on line broadening according to a procedure described in Chapter 9 of "X-Ray Diffraction Procedure", by P. Klug, L. E. Alexander, published by Wiley in 1954.

In one embodiment, nanoparticles of the NTE filler may be prepared following the comminution methods of U.S. Pat. No. 5,704,556.

In one embodiment, the NTE filler is present in the rubber composition in a concentration ranging from 5 to 50 parts by weight per 100 parts by weight of diene based elastomer (phr). In another embodiment, the NTE filler is present in the rubber composition in a concentration ranging from 15 to 40 parts by weight per 100 parts by weight of diene based elastomer (phr).

The rubber composition comprising an NTE filler may be used with rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene(polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products and British Standard* 2000 *Parts,* 2003, 62nd edition, published by the Institute of Petroleum, United Kingdom.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials, and such terms are well known to those having skill in the rubber mixing or rubber compounding art.

In additional to the NTE filler, the vulcanizable rubber composition may include from about 10 to about 150 phr of silica.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

The vulcanizable rubber composition may include from 1 to 100 phr of carbon black, crosslinked particulate polymer gel, ultra high molecular weight polyethylene (UHMWPE) or plasticized starch.

Commonly employed carbon blacks can be used as a conventional filler. Representative examples of such carbon blacks include N 110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639.

In one embodiment the rubber composition for use in the tire tread may contain a conventional sulfur containing organosilicon compound. Examples of suitable sulfur containing organosilicon compounds are of the formula:

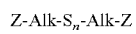

in which Z is selected from the group consisting of

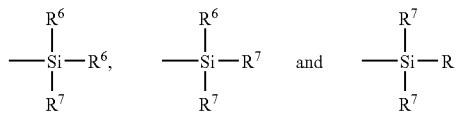

where $R^6$ is an alkyl group of 1 to 4 carbon atoms, cyclohexyl or phenyl; $R^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl)sulfides. In one embodiment, the sulfur containing organosilicon compounds are 3,3'-bis(triethoxysilylpropyl)disulfide and 3,3'-bis(triethoxysilylpropyl)tetrasulfide. Therefore, as to formula II, Z may be

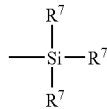

where $R^7$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from GE Silicones.

In another embodiment, suitable sulfur containing organosilicon compounds include those disclosed in U.S. Patent Publication 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the compound is a sidewall insert.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In one embodiment, the at least one component of the pneumatic tire may include a sidewall component such as a runflat insert or an apex. Such runflat inserts and apexes are intended to provide support to the sidewall of a runflat tire during a deflation event. In one embodiment, the insert may be incorporated into a runflat tire of the design described in application Ser. No. 10/317,341 filed Dec. 12, 2002, the teachings of which are incorporated herein by reference in their entirety. In another embodiment, the insert may be incorporated into a runflat tire of the design described in application Ser. No. 10/818,724, filed on Apr. 6, 2004, the teachings of which are incorporated herein by reference in their entirety. In still another embodiment of this invention, the insert may be incorporated into a runflat tire disclosed in application Ser. No. 11/017,123, filed Dec. 20, 2004, the teachings of which are incorporated herein by reference in their entirety.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising at least one component selected from the group consisting of runflat sidewall inserts and apexes, the at least one component comprising a rubber composition, the rubber composition comprising a diene based elastomer and an inorganic negative thermal expansion (NTE) filler comprising at least one compound selected from the group consisting of metal tungstates, metal phosphates, metal molybdates, metal vanadates, and metal arsenates, wherein the inorganic filler has a negative coefficient of thermal expansion in at least part of the temperature range of 0° C. to 200° C.

2. The pneumatic tire of claim 1, wherein the NTE filler has a particle size of less than 500 nm.

3. The pneumatic tire of claim 1, wherein the NTE filler has a particle size of less than 300 nm.

4. The pneumatic tire of claim 1, wherein the NTE filler has a particle size of less than 100 nm.

5. The pneumatic tire of claim 1 wherein the NTE filler comprises at least one material selection from the group consisting of $ZrW_2O_8$, $HfW_2O_8$, $Zr_2P_2WO_{12}$, or $Hf_2P_2WO_{12}$.

6. The pneumatic tire of claim 1 wherein the NTE filler comprises at least one material of formula I

     (I)

wherein x is from about 0.1 to about 1.9, y is from about 0.0 to about 0.4, and wherein $A^{4+}$ is selected from the group consisting of Hf, Zr, $Zr_a M_b$, $Hf_a M_b$ and mixtures thereof, wherein a plus b equals one and M is selected from the group consisting of Ti, Ce, Th, U, Mo, W, Pb, Sn, Ge and Si, $A^{1+}$ is selected from the group consisting of the alkali earth metals, $A^{3+}$ is selected from the group consisting of the rare earth metals, and E is selected from the group consisting of P and As.

7. The pneumatic tire of claim 1 wherein the NTE filler comprises at least one material of formula II

     (II)

wherein for $A^{3+}$ is a metal having an oxidation state of plus 3, $A^{4+}$ is a metal having an oxidation state of plus 4, $M^{3+}$ is a metal having an oxidation state of plus 3, $M^{6+}$ is a metal having an oxidation state of plus 6, y varies from about 0 to about 2, x is equal to the sum of y and z and varies from about 0.1 to about 1.9.

8. The pneumatic tire of claim 1 wherein the NTE filler has a coefficient of thermal expansion ranging from $-1 \times 10^{-7}$ to $-100 \times 10^{-7} K^{-1}$ in at least part of the temperature range of 0° C. to 200° C.

9. The pneumatic tire of claim 1 wherein the NTE filler has a coefficient of thermal expansion ranging from $-10 \times 10^{-7}$ to $-80 \times 10^{-7} K^{-1}$ in at least part of the temperature range of 0° C. to 200° C.

10. The pneumatic tire of claim 1 wherein the NTE filler has a coefficient of thermal expansion ranging from $-20 \times 10^{-7}$ to $-40 \times 10^{-7} K^{-1}$ in at least part of the temperature range of 0° C. to 200° C.

11. The pneumatic tire of claim 1 wherein the NTE filler is present in a concentration ranging from 5 to 50 parts by weight per 100 parts by weight of diene based elastomer (phr).

12. The pneumatic tire of claim 1 wherein the NTE filler is present in a concentration ranging from 15 to 40 parts by weight per 100 parts by weight of diene based elastomer (phr).

* * * * *